(12) United States Patent
Yano et al.

(10) Patent No.: US 6,699,596 B2
(45) Date of Patent: Mar. 2, 2004

(54) PHOSPHOR THIN FILM, PREPARATION METHOD, AND EL PANEL

(76) Inventors: Yoshihiko Yano, c/o TDK Corporation of 1-13-1, Nihonbashi, Chuo-ku, Tokyo, 103-8272 (JP); Katsuto Nagano, c/o TDK Corporation of 1-13-1, Nihonbashi, Chuo-ku, Tokyo, 103-8272 (JP)

( * ) Notice: Subject to any disclaimer, the term of this patent is extended or adjusted under 35 U.S.C. 154(b) by 0 days.

(21) Appl. No.: 09/866,699

(22) Filed: May 30, 2001

(65) Prior Publication Data

US 2002/0031685 A1 Mar. 14, 2002

(30) Foreign Application Priority Data

Sep. 21, 2000 (JP) ........................................ 2000-287489

(51) Int. Cl.⁷ ........................... B32B 19/00; B32B 9/00; H01J 63/04

(52) U.S. Cl. ....................... 428/690; 428/917; 313/503; 313/504

(58) Field of Search ................. 428/690, 917; 252/301.4 R; 264/21; 313/502, 503

(56) References Cited

U.S. PATENT DOCUMENTS

| | | | | |
|---|---|---|---|---|
| 4,547,703 A | * | 10/1985 | Fujita et al. ................. | 313/509 |
| 4,847,609 A | * | 7/1989 | Kuwata et al. ............. | 340/781 |
| 5,602,445 A | * | 2/1997 | Solanki et al. .............. | 313/503 |
| 6,072,198 A | * | 6/2000 | Sun et al. .................... | 257/103 |
| 6,218,774 B1 | * | 4/2001 | Pope ........................... | 313/461 |
| 6,242,858 B1 | * | 6/2001 | Sun ............................. | 313/503 |
| 6,403,204 B1 | * | 6/2002 | Kitai et al. .................. | 428/212 |
| 6,447,654 B1 | * | 9/2002 | Kosyachkov .......... | 204/192.15 |
| 2002/0122895 A1 | | 9/2002 | Cheong et al. ............. | 427/566 |

FOREIGN PATENT DOCUMENTS

| | | | |
|---|---|---|---|
| JP | 07-123364 | * | 5/1995 |
| JP | 8-134440 | | 5/1996 |
| JP | 08-134440 | * | 5/1996 |
| JP | 09-263756 | * | 10/1997 |
| JP | 2840185 (7-122364) | | 10/1998 |
| JP | 2001-118677 | | 4/2001 |

OTHER PUBLICATIONS

Mitsuhiro Kawanishi, et al., Technical Report of IEICE. EID98–113, pp. 19–24, "$CaAl_2S_4$:Ce Thin Film El Devices Prepared by the Two Targets Pulse Electron–Beam Evaporation", Jan. 1999 (with Partial English translation).

Noboru Miura, et al., Jpn. J. Appl. Phys., vol. 38, part 2, No. 11B, pp. 1291–1292, "High–Luminance Blue–Emitting $BaAl_2S_4$:Eu Thin–Film Electroluminescent Devices", Nov. 15, 1999.

Oshio Shozo, et al., Display and Imaging, vol. 3, pp. 181–187, "Novel Electroluminescent Thin Films: Thiogallate–Type Phosphors", 1994, (with concise Explanation and Partial English translation).

P.C. Donohue, et al., J. Electrochem. Soc., vol. 121, No. 1, pp. 137–141, "The Synthesis and Photoluminescence of $M^{II}M_2^{III}(S,Se)_4$", Jan. 1974.

(List continued on next page.)

*Primary Examiner*—Cynthia H. Kelly
*Assistant Examiner*—Camie Thompson
(74) *Attorney, Agent, or Firm*—Foley & Lardner

(57) ABSTRACT

The invention aims to provide a phosphor thin film eliminating a need for filters, having a satisfactory color purity and useful as the blue color in full-color EL displays, a method for preparing the same and an EL panel. Such objects are achieved by a phosphor thin film formed of a matrix material comprising barium thioaluminate as a main component to which magnesium is added and rare earth element, Eu is added as a luminescent center, a method for preparing the same, and an EL panel using the same.

19 Claims, 2 Drawing Sheets

OTHER PUBLICATIONS

Isao Tanaka, et al., The 22nd Seminar Data Photoelectric Inter–Conversion the 125$^{th}$ Commission EL Department, pp. 16–21, "Composition and Optical Properties of Blue–Emitting $BaAl_2S_4$: $Eu^{2+}$ Electroluminescent Thin Films", May 26, 2000, (with concise Explanation and Partial English translation).

P. Benalloul, et al., Appl. Phys. Lett., vol. 63, No. 14, pp. 1954–1956, "$IIA–III_2–S_4$ Ternary Compounds:New Host Matrices for Full Color Thin Film Electroluminescence Displays", Oct. 4, 1993.

K.T. Le Thi, et al., Materials Science and Engineering, vol. B14, pp. 393–397, "Investigation of the $MS–Al_2S_3$ Systems (M=Ca, Sr, Ba) and Luminescence Properties of Europium–Doped Thioaluminates", 1992.

* cited by examiner

PHOSPHOR THIN FILM, PREPARATION METHOD, AND EL PANEL

BACKGROUND OF THE INVENTION

1. Technical Field

This invention relates to a light-emitting layer for use in inorganic EL devices, and more particularly, to a phosphor thin film used as a light-emitting layer and an EL panel using the same.

2. Background Art

In the recent years, active research works have been made on thin-film EL devices as small-size and large-size, light-weight flat displays. A monochromatic thin-film EL display using a phosphor thin film of manganese-doped zinc sulfide capable of emitting yellowish orange light has already become commercially practical as a dual insulated structure using thin-film insulating layers 2 and 4 as shown in FIG. 2. In FIG. 2, a predetermined pattern of lower electrodes 5 is formed on a substrate 1, and a first insulating layer 2 is formed on the lower electrodes 5. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primaries of red, green and blue have poor characteristics. Engineers continued research on SrS:Ce (using SrS as a matrix material and Ce as a luminescent center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, its luminance is still short as the blue color for full-color displays and its chromaticity is shifted toward green. There is a desire to have a better blue light-emitting layer.

To solve the above problem, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shinshu Univ. Technical Report, EID 98–113, pp. 19–24, and Jpn. J. Appl. Phys., Vol. 38 (1999), pp. L1291–1292. From the $BaAl_2S_4$:Eu phosphor, light of CIE1931 chromaticity coordinates (0.12, 0.10) is obtained. However, there is a need for a blue phosphor having a higher color purity. If blue light having a higher purity, especially blue light having CIE1931 chromaticity coordinates of x<about 0.2 and y<0.10, that is, NTSC blue of (0.14, 0.08) is developed, then a display of better quality becomes available.

SUMMARY OF THE INVENTION

An object of the invention is to provide a phosphor thin film eliminating a need for filters, having a satisfactory color purity and useful as the blue color in full-color EL displays, a method for preparing the same, and an EL panel.

This and other objects are attained by the present invention which is defined below as (1) to (6).

(1) A phosphor thin film formed of a matrix material comprising barium thioaluminate as a main component and having europium added thereto as a luminescent center, said matrix material further containing magnesium.

(2) The phosphor thin film of (1) wherein magnesium is added in such an amount as to give an atomic ratio Mg/(Ba+Mg) between 0.05 and 0.8.

(3) The phosphor thin film of (1) or (2) which emits blue light having chromaticity coordinates of x<0.2 and y<0.10.

(4) An EL panel having the phosphor thin film of any one of (1) to (3).

(5) A method for preparing the phosphor thin film of any one of (1) to (3) by an evaporation process, placing at least an aluminum sulfide source, a barium sulfide source having a luminescent center added thereto, and a magnesium metal source in a vacuum chamber, and evaporating aluminum sulfide, barium sulfide and magnesium metal from the respective sources and depositing the evaporated substances on a substrate while binding the substances together, thereby forming a sulfide phosphor thin film.

(6) A method for preparing the phosphor thin film of any one of (1) to (3) by an evaporation process, placing at least a barium thioaluminate source having a luminescent center added thereto and a magnesium metal source in a vacuum chamber, and evaporating barium thioaluminate and magnesium metal from the respective sources and depositing the evaporated substances on a substrate while binding the substances together, thereby forming a sulfide phosphor thin film.

DESCRIPTION OF THE PREFERRED EMBODIMENTS

Figure 1:
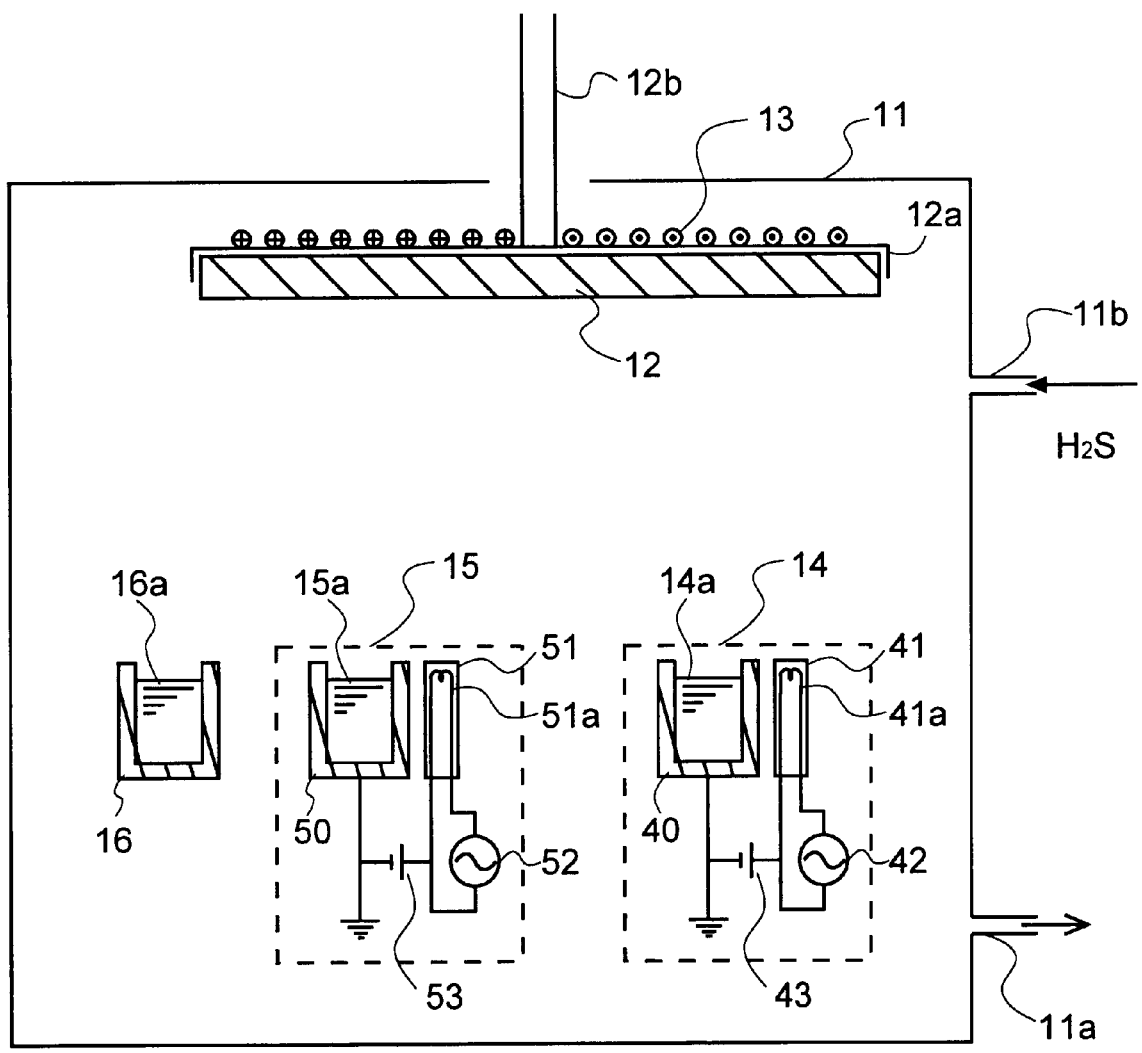
FIG. 1 is a schematic cross-sectional view showing an exemplary construction of the apparatus to which the method of the invention is applicable or the manufacturing apparatus of the invention.

Several embodiments of the invention are described in detail.

The invention provides a means of adding magnesium to a barium thioaluminate-base EL material for further improving the luminance and blue color purity thereof.

The phosphor thin film of the invention is formed of a barium thioaluminate-base matrix material having europium added thereto as a luminescent center and further having magnesium added thereto.

Examples of the barium thioaluminate used in the phosphor thin film of the invention include $Ba_5Al_2S$, $Ba_4Al_2S_7$, $Ba_2Al_2S_5$, $BaAl_2S_4$, $BaAl_4S_7$, $Ba_4Al_4S_{25}$, $BaAl_8S_{13}$, and $BaAl_{12}S_{19}$. The matrix material may use these compounds alone or in admixture of two or more and take an amorphous state where a distinct crystalline structure is absent.

Also oxygen may substitute for sulfur in barium thioaluminate to convert it to barium aluminate. Also acceptable is an oxysulfide intermediate barium aluminate and barium thioaluminate.

The phosphor thin film of the invention is arrived at by adding magnesium to the above-described matrix material and is preferably represented by the compositional formula:

$$(Ba,Mg)_xAl_yO_zS_w:Eu.$$

In the formula, x, y, z and w denote molar ratios of elements Ba, Al, O and S, and are preferably in the ranges of:

x=1 to 5,
y=1 to 15,
z=3 to 30, and
w=3 to 30.

Preferably magnesium is added in such an amount that the atomic ratio of Mg to Ba in the barium thioaluminate matrix material, as expressed by Mg/(Ba+Mg), may fall in the range between 0.05 and 0.8, especially between 0.3 and 0.6.

Magnesium is effective for shifting the EL emission spectrum to the shorter wavelength side. When magnesium is added to barium thioaluminate, the matrix material is increased in band gap so that the europium added may undertake effective transition within the compound crystal field, producing light emission of shorter wavelength.

The amount of europium added as a luminescent center is preferably 0.5 to 10 atom % based on (Ba+Mg) atoms.

The phosphor thin film of the invention can emit light of blue color having a high purity, that is, CIE1931 chromaticity coordinates of x<0.2, especially x=0.1 to 0.2, and y<0.10, especially y=0.02 to 0.1. That is, emission of blue light approximate to the NTSC blue (0.14, 0.08) is possible. The emission of blue light having such a high purity eliminates a need for filters, contributing to the manufacture of applied devices of improved quality and reduced cost.

The phosphor thin film is preferably prepared, for example, by an evaporation process to be described below.

More particularly, a barium thioaluminate pellet having europium added is prepared. The pellet is evaporated in a vacuum chamber by irradiating electron beams, and at the same time, magnesium metal is evaporated by resistive heating for thereby adding magnesium. The amount of Mg added is adjusted by previously measuring the deposition rates of vapor substances from the EB source and the resistive heating source, and controlling the powers to the respective sources on the basis of the measured rates. $H_2S$ gas may be admitted during the evaporation.

Alternatively, a multi-source reactive deposition process is employable. Exemplary is a ternary evaporation process using a barium sulfide pellet having europium added thereto, aluminum sulfide and magnesium. More specifically, a sulfide phosphor thin film is formed by placing at least an aluminum sulfide source, a barium sulfide source having a luminescent center added thereto, and a magnesium metal source in a vacuum chamber, and evaporating aluminum sulfide, barium sulfide and magnesium metal from the respective sources and depositing the evaporated substances on a substrate while binding the substances together.

Europium added to the source substance may take the form of metal, fluoride, oxide or sulfide. Since the amount of europium added varies depending on the source substance and the thin film to be deposited, the composition of the source substance is adjusted so as to achieve an appropriate dosage.

During the evaporation, the temperature of the substrate may be at room temperature to 600° C., preferably 300 to 500° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable. Also preferably, the film deposition is followed by annealing. The preferred annealing temperature is 600° C. to 1,000° C., and more preferably 600° C. to 800° C.

The oxide phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, air, sulfur vapor or $H_2S$ after its formation.

It is also preferred to carry out anneal treatment on the Mg-added barium thioaluminate thin film in an oxidizing atmosphere such as oxygen or air after its formation and in combination with the anneal treatment. For example, once a thin film is formed by a binary reactive deposition process using a barium sulfide pellet having Eu and Mg added thereto, an aluminum sulfide pellet and hydrogen sulfide ($H_2S$) gas, it may be annealed in air.

Further, it is preferred to produce the phosphor thin film of the invention by alternately forming magnesium sulfide films and barium thioaluminate films, and annealing the multilayer structure into a Mg-added barium thioaluminate thin film.

Still further, it is preferred to produce the phosphor thin film of the invention by alternately forming magnesium thioaluminate films and barium thioaluminate films, and annealing the multilayer structure.

When annealed at 400 to 800° C., magnesium diffuses through the multilayer structure to promote crystallization and achieve a blue shift of the emission spectrum.

The aforementioned annealing treatment is effective for outstandingly increase the EL light emission luminance of the phosphor thin film. The annealing treatment promotes crystallization of the EL thin film and introduces oxygen into the alkaline earth thioaluminate. In addition, the rare earth added as the luminescent center possesses effective transition within compound crystals, producing light emission at a high luminance. For example, where Eu is the luminescent center, $Eu^{2+}$ contributing to blue light emission is stabilized in the EL thin film.

The light emitting device has a lifetime in that the luminance drops with the lapse of light emitting time. The composition in which sulfur and magnesium are co-present with oxygen improves the lifetime performance and prevents the luminance from dropping. As compared with the matrix material of pure sulfide, the matrix material having magnesium or an oxygen compound incorporated therein is stable in air. This is probably because the stable oxide component protects the sulfide component in the film from oxygen. Therefore, according to the inventors' investigation, an optimum value exists between the sulfide and magnesium and optionally, oxide composition.

The contents of sulfur and oxygen in the matrix material may be adjusted at the stage of the raw material composition or by forming the thin film and then effecting anneal treatment on the thin film under controlled conditions.

No particular limits are imposed on the thickness of the light emitting layer. However, too thick a layer requires an increased drive voltage whereas too thin a layer results in a low emission efficiency. Illustratively, the light emitting layer is preferably about 100 to 2,000 nm thick, especially about 150 to 700 nm although the thickness varies depending on the identity of the fluorescent material.

The pressure during evaporation is preferably $1.33 \times 10^{-4}$ to $1.33 \times 10^{-1}$ Pa ($1 \times 10^{-6}$ to $1 \times 10^{-3}$ Torr). When a gas such as $H_2S$ is introduced, the pressure may be adjusted to 6.65×10⁻³ to 6.65×10⁻² Pa (5×10⁻⁵ to 5×10⁻⁴ Torr). If the pressure exceeds the range, the operation of the electron gun becomes unstable, and composition control becomes very difficult. The rate of gas feed is preferably 5 to 200 standard cubic centimeters per minute (SCCM), especially 10 to 30 SCCM although it varies depending on the power of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the characteristics of the light emitting layer may become poor. The means for rotating the substrate may be any well-known rotating mechanism including a power source such as a motor or hydraulic rotational mechanism and a power transmission/gear mechanism having a combination of gears, belts, pulleys and the like.

The means for heating the evaporation source and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

FIG. 1 illustrates one exemplary construction of the apparatus for forming the light emitting layer according to the invention. Reference is made to an embodiment wherein Mg-added barium aluminate:Eu is produced by using aluminum sulfide, barium sulfide and magnesium as the evaporation sources and admitting $H_2S$ during evaporation. In the illustrated embodiment, a substrate 12 on which the light emitting layer is to be deposited, EB evaporation sources 14 and 15, and a resistive heating evaporation source 16 are disposed within a vacuum chamber 11.

In the resistive heating evaporation source 16 having a heater (not shown) mounted therearound, a metal (magnesium) 16a is contained to constitute the magnesium evaporation source.

The electron beam (EB) evaporation sources 14 and 15 serving as means for evaporating aluminum sulfide and barium sulfide include crucibles 40 and 50 which contain barium sulfide 14a having a luminescent center added thereto and aluminum sulfide 15a, and electron guns 41 and 51 having electron emitting filaments 41a and 51a built therein, respectively. Built in the electron guns 41, 51 are mechanisms for controlling electron beams. To the electron guns 41, 51 are connected ac power supplies 42, 52 and bias power supplies 43, 53. The electron guns 41, 51 produce electron beams alternately at predetermined powers in a controlled manner, for evaporating the barium sulfide 14a having a luminescent center added thereto and the aluminum sulfide 15a in a predetermined ratio. Although the evaporation sources are controlled by two electron guns in the illustrated embodiment, multi-source simultaneous evaporation using a single electron gun is also possible. The evaporation process of the latter is known as multi-source pulse evaporation process.

In the illustrated embodiment, the evaporation sources 14, 15, 16 are depicted, for the convenience of illustration, at positions corresponding to discrete local areas of the substrate. Actually, the evaporation sources are located such that the deposited film may become uniform in composition and thickness.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, vapors of barium sulfide, aluminum sulfide and magnesium are evaporated from the EB evaporation sources 14, 15 and resistive heating source 16 and deposited on the substrate 12 where they are bound together to form a magnesium-added barium thioaluminate fluorescent layer. By rotating the substrate 12 during the evaporation process if desired, the light emitting layer being deposited can be made more uniform in composition and thickness distribution.

There have been described the fluorescent thin film material and the method of manufacture by evaporation according to the invention, by which a phosphor thin film having a higher luminance and a further improved color purity of blue can be easily formed.

Figure 2:
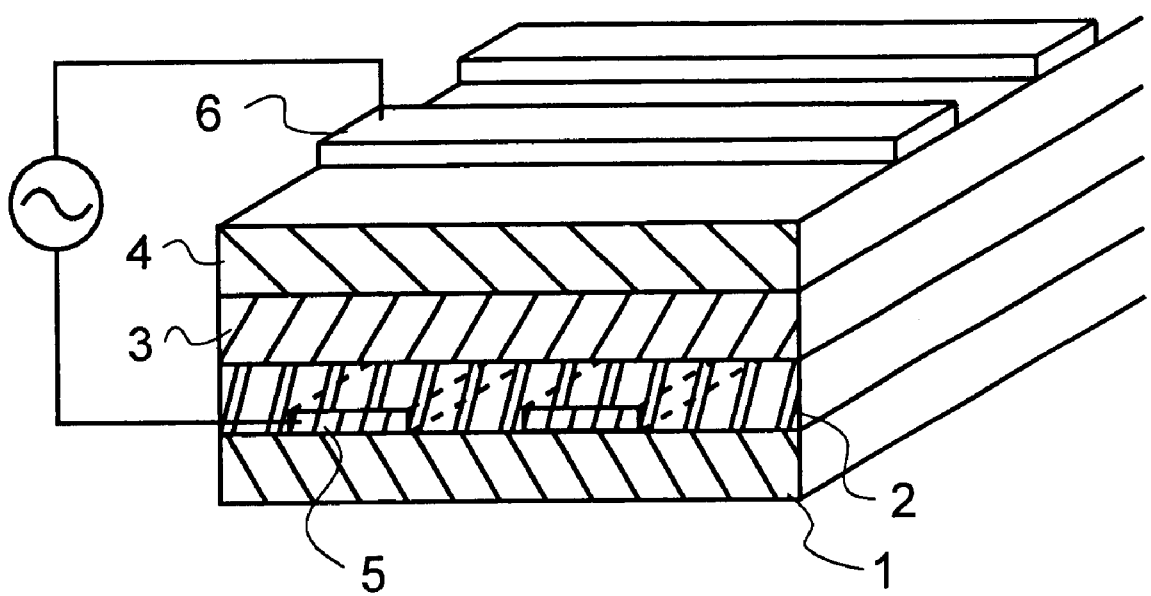
FIG. 2 is a partially cross-sectional, perspective view showing an exemplary construction of the inorganic EL device which can be manufactured by the method and apparatus of the invention.

Using the phosphor thin film of the invention as a light emitting layer 3, an inorganic EL device is manufactured, for example, to the structure shown in FIG. 2. Between the substrate 1, electrodes 5, 6, thick-film insulating layer 2 and thin-film insulating layer 4, there may be disposed intermediate layers such as a layer for enhancing bond, a layer for mitigating stress, and a layer for preventing reaction. The thick film may be improved in smoothness as by polishing its surface or using a smoothing layer.

FIG. 2 is a partially cross-sectional, perspective view showing an exemplary construction of the inorganic EL device using the light emitting layer of the invention. In FIG. 2, a predetermined pattern of lower electrodes 5 is formed on a substrate 1, and a first thick insulating layer (or thick-film dielectric layer) 2 is formed on the lower electrodes 5. On the first insulating layer 2, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include ceramic substrates of glass, alumina ($Al_2O_3$), forsterite ($2MgO·SiO_2$), steatite ($MgO·SiO_2$), mullite ($3Al_2O_3·2SiO_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates having a heat resistant temperature of higher than about 1,000° C. are especially preferable. Where heat transfer is necessary, berillia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least $10^8$ $\Omega \cdot cm$, especially about $10^{10}$ to $10^{18}$ $\Omega \cdot cm$. A material having a relatively high permittivity as well is preferred. The permittivity $\epsilon$ is preferably about 100 to 10,000. The preferred thickness is 5 to 50 $\mu m$, especially 10 to 30 $\mu m$.

The insulating layer thick film is formed by any desired method. Methods capable of relatively easily forming films of 10 to 50 $\mu m$ thick are useful, and the sol-gel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, CVD, sol-gel and printing/firing methods may be used. The insulating layer preferably has a thickness of about 50 to 1,000 nm, especially about 100 to 500 nm.

The electrode (lower electrode) is formed at least on the substrate side or within the first dielectric. As the electrode layer which is exposed to high temperature during formation of a thick film and during heat treatment along with the light emitting layer, there may be employed a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate is transparent, a transparent electrode may also be used as the lower electrode because this permits the emitted light to exit from the substrate side. Use of transparent electrodes of ZnO, ITO or the like is especially preferred. ITO generally contain $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 $\Omega \cdot cm$, especially about 0.003 to 0.1 $\Omega \cdot cm$ in order to apply an effective electric field across the light emitting layer. The preferred thickness of the electrode layer is about 50 to 2,000 nm, especially about 100 to 1,000 nm.

Although the light emitting layer of the invention is applied to inorganic EL devices in the illustrated embodiment, it may be applied to another type of device as long as the phosphor thin film of the invention can be used therein, and especially to blue light emitting devices, which can be applied to full-color display panels.

EXAMPLE

Examples are given below for illustrating the invention in more detail.

Example 1

An exemplary evaporation chamber which can be used in the manufacturing method of the invention is illustrated in FIG. 1. There were used a two-point controlled gun and a resistive heating source.

An EB source 15 containing BaS powder having 5 mol % of Eu added, another EB source 14 containing $Al_2S_3$ powder, and a resistive heating source 16 containing Mg were placed in a vacuum chamber 11. The materials were simultaneously evaporated from the respective sources, and deposited on a rotating substrate heated at 150° C., forming a (Ba,Mg) $Al_2S_3$:Eu layer. The rates of evaporation from the respective sources were adjusted so as to provide a deposition rate of 1 nm/sec for $(Ba,Mg)Al_2S_3$:Eu. During evaporation, $H_2S$ gas was admitted at 10 SCCM. After the thin film was formed, it was annealed at 750° C. for 10 minutes in an Ar atmosphere.

The $(Ba,Mg)Al_2S_3$:Eu thin film formed on a Si substrate as a monitor was analyzed for composition by x-ray fluorescence to find an atomic ratio of Ba:Mg:Al:S:O:Eu= 5.32:4.16:22.15:12.02:56.17:0.17. It was a barium thioaluminate film containing a substantial amount of oxygen.

Using this light emitting layer, an EL device of the structure shown in FIG. 2 was fabricated.

For both the substrate and the thick-film insulating layer, a $BaTiO_3$ base dielectric material having a permittivity of 5,000 was commonly used. A Pd electrode was used as the lower electrode. The device was fabricated by furnishing a sheet for the substrate, and forming the lower electrode and thick-film insulating layer on the sheet by a screen printing technique to form a green sheet, followed by co-firing. The surface was polished, yielding a substrate bearing a thick-film first insulating layer of 30 $\mu m$ thick.

On this substrate, a phosphor thin film (light emitting layer) was formed to 300 nm by the same procedure as above.

Then a second insulating layer thin film was formed on the phosphor thin film. $Ta_2O_5$ was used for the second insulating layer thin film, and a $Ta_2O_5$ film of 200 nm thick was formed. By RF magnetron sputtering technique using an ITO oxide target, a transparent ITO electrode of 200 nm thick was formed on the second insulating layer thin film at a substrate temperature of 250° C., completing the EL device.

When an electric field having a frequency of 1 kHz and a pulse width of 50 $\mu$S was applied across the electrodes, the EL device emitted blue light having a luminance of 200 cd/m$^2$ and CIE1931 chromaticity coordinates (0.1347, 0.0789). The spectrum of light emission had a peak wavelength of 464 nm.

An EL device, which was similarly fabricated without addition of Mg, emitted blue light having CIE1931 chromaticity coordinates (0.1197, 0.1366), and the spectrum of light emission had a peak wavelength of 474 nm. It is evident that the addition of Mg leads to blue light of higher purity.

Example 2

$(Ba,Mg)Al_2S_3$:Eu was formed as in Example 1 except that an EB gun was used instead of the two-point controlled gun, and a resistive heating source containing an Eu-doped barium thioaluminate pellet and Mg was used. Four light emitting layers were formed in which the atomic ratio Mg/(Mg+Ba) was changed from 0 to 0.1, 0.3 and 0.5. The resulting EL devices were evaluated in terms of blue light emission.

The spectrum of light emission of the EL devices in which the atomic ratio Mg/(Mg+Ba) was 0, 0.1, 0.3 and 0.5 had a wavelength of 472 nm, 471 nm, 470 nm and 460 nm, respectively. The addition of Mg shifts the spectrum to the shorter wavelength side. The EL device having an atomic ratio Mg/(Mg+Ba) of 0.5 produced blue light of a high purity close to the NTSC blue.

The phosphor thin film of the invention offers a phosphor thin film material capable of emitting blue light having a high color purity without a need for filters and a high luminance.

Benefits of the Invention

The invention provides a phosphor thin film eliminating a need for filters, having a satisfactory color purity and useful as the blue color in full-color EL displays, a method for preparing the same and an EL panel.

What is claimed is:

1. A phosphor thin film comprising a matrix material comprising barium thioaluminate as a main component and having europium added thereto as a luminescent center, said matrix material further comprising magnesium present in an atomic ratio Mg/(Ba+Mg) between 0.05 and 0.8.

2. The phosphor thin film of claim 1 which emits blue light having chromaticity coordinates of x<0.2 and y<0.10.

3. An EL panel comprising the phosphor thin film of claim 1.

4. A method for preparing the phosphor thin film of claim 1 by an evaporation process,
    placing at least an aluminum sulfide source, a barium sulfide source having a luminescent center added thereto, and a magnesium metal source in a vacuum chamber, and
    evaporating aluminum sulfide, barium sulfide and magnesium metal from the respective sources and depositing the evaporated substances on a substrate while binding the substances together, thereby forming a sulfide phosphor thin film.

5. A method for preparing the phosphor thin film of claim 1 by an evaporation process,
    placing at least a barium thioaluminate source having a luminescent center added thereto and a magnesium metal source in a vacuum chamber, and
    evaporating barium thioaluminate and magnesium metal from the respective sources and depositing the evaporated substances on a substrate while binding the substances together, thereby forming a sulfide phosphor thin film.

6. The phosphor thin film according to claim 1, of the formula

$(Ba,Mg)_xAl_yO_zS_w$:Eu wherein x, y, z and w represent molar ratios and
    x=1 to 5
    y=1 to 15
    0–30, and
    w=3–30.

7. The phosphor thin film according to claim 1, wherein said atomic ratio is between 0.3 and 0.6.

8. The phosphor thin film according to claim 1, wherein said atomic ratio is 0.1.

9. The phosphor thin film according to claim 1, wherein said atomic ratio is 0.3.

10. The phosphor thin film according to claim 1, wherein said atomic ratio is 0.5.

11. An EL panel comprising the phosphor thin film of claim 6.

12. An EL panel comprising the phosphor thin film of claim 7.

13. An EL panel comprising the phosphor thin film of claim 8.

14. An EL panel comprising the phosphor thin film of claim 9.

15. An EL panel comprising the phosphor thin film of claim 10.

16. The phosphor thin film according to claim 1, wherein some of the sulfur atoms of the barium thioaluminate are replaced with oxygen, and the atomic ratio 0/S ranges from 0.1 to 10.

17. The phosphor thin film according to claim 16, wherein th phosphor thin film emits blue light having chromaticity coordinates of x<0.2 and y<0.10.

18. An EL panel comprising the phosphor thin film of claim 16.

19. The phosphor thin film according to claim 6, wherein z=3–30.

* * * * *

UNITED STATES PATENT AND TRADEMARK OFFICE
CERTIFICATE OF CORRECTION

PATENT NO. : 6,699,596 B2
DATED : March 2, 2004
INVENTOR(S) : Yano et al.

It is certified that error appears in the above-identified patent and that said Letters Patent is hereby corrected as shown below:

<u>Title page,</u>
Item [73], Assignee, should read -- TDK Corporation, Tokyo (JP) --
Item [75], Inventors, should read -- (75) Inventors: Yoshihiko Yano, Tokyo (JP); Katsuto Nagano, Tokyo (JP) --

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,699,596 B2
DATED : March 2, 2004
INVENTOR(S) : Yoshihiko Yano et al.

It is certified that error appears in the above-identified patent and that said Letters Patent is hereby corrected as shown below:

Column 10,
Line 30, "0-30, and" should read -- z=0-30, and --;
Line 55, "th" should read -- the --.

Signed and Sealed this

Tenth Day of August, 2004

JON W. DUDAS
*Acting Director of the United States Patent and Trademark Office*